United States Patent
Gotoh (10) Patent No.: US 7,886,114 B2
(45) Date of Patent: Feb. 8, 2011

(54) STORAGE CONTROLLER FOR CACHE SLOT MANAGEMENT

(75) Inventor: Youichi Gotoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 12/213,919

(22) Filed: Jun. 26, 2008

(65) Prior Publication Data

US 2008/0270689 A1 Oct. 30, 2008

Related U.S. Application Data

(63) Continuation of application No. 11/266,178, filed on Nov. 4, 2005, now abandoned.

(30) Foreign Application Priority Data

Sep. 14, 2005 (JP) ............................. 2005-267184

(51) Int. Cl.
*G06F 12/00* (2006.01)
*G06F 13/00* (2006.01)
*G06F 13/28* (2006.01)

(52) U.S. Cl. .................................................. 711/144
(58) Field of Classification Search ................... None
See application file for complete search history.

(56) References Cited

U.S. PATENT DOCUMENTS

| | | | |
|---|---|---|---|
| 5,325,505 A | 6/1994 | Hoffecker et al. ............ | 707/101 |
| 6,622,214 B1 | 9/2003 | Vogt et al. .................. | 711/141 |
| 7,197,547 B1 | 3/2007 | Miller et al. ................ | 709/223 |
| 2004/0006669 A1 | 1/2004 | Endo et al. .................. | 711/128 |
| 2004/0039880 A1 | 2/2004 | Pentkovski et al. ......... | 711/146 |
| 2004/0059875 A1 | 3/2004 | Garg et al. .................. | 711/141 |
| 2005/0114615 A1 | 5/2005 | Ogasawara et al. ......... | 711/162 |
| 2006/0059317 A1* | 3/2006 | Kakeda ....................... | 711/145 |

FOREIGN PATENT DOCUMENTS

JP 9160889 6/1997

OTHER PUBLICATIONS

Jim Handy, "The Cache Memory Book", 1998, Academic Press, $2^{nd}$ Edition, p. 126.

* cited by examiner

*Primary Examiner*—Kevin L Ellis
*Assistant Examiner*—Chad L Davidson
(74) *Attorney, Agent, or Firm*—Brundidge & Stanger, P.C.

(57) ABSTRACT

When a first channel processor from among a plurality of channel processors receives an I/O request from a host system, a second channel processor, which is to execute a part of the processing to respond to the I/O request, is selected from among the channel processors based on the LM directories of the respective channel processors. The selected second channel processor checks whether there is a cache hit. If there is a cache hit, it transfers the data from the cache memory to the buffer memory. The first channel processor then processes the I/O request using the data transferred to the buffer memory.

7 Claims, 5 Drawing Sheets

| AREA\HASH KEY | AREA 1 | AREA 2 | ... | AREA N | AREA N+1 | ... | AREA 2N | AREA 2N+1 | ... | AREA 3N | AREA 3N+1 | ... |
|---|---|---|---|---|---|---|---|---|---|---|---|---|
| 0 | | | | | | | | | | | | |
| 1 | | | | | | | | | | | | |
| 2 | | | | | | | | | | | | |
| 3 | | | | | | | | | | | | |
| 4 | | | | | | | | | | | | |

STORAGE CONTROLLER FOR CACHE SLOT MANAGEMENT

CROSS REFERENCES TO RELATED APPLICATIONS

The present application is a continuation of application Ser. No. 11/266,178, filed Nov. 4, 2005, now abandoned; which relates to and claims priority from Japanese Patent Application No. 2005-267184, filed on Sep. 14, 2005, the entire disclosure of which is incorporated herein by reference.

BACKGROUND OF THE INVENTION

The present invention relates to a storage controller, data processing method and a computer program product.

Lately, disk array apparatuses have been used as storage systems for managing large amounts of data. A disk array apparatus, having a number of disk drives arranged in arrays, provides host systems with storage resources, which together form a RAID (Redundant Arrays of Independent Inexpensive Disks) structure. A storage area network (SAN) environment using Fibre Channel (FC) protocol as an interface for network-connecting the host systems and the disk array apparatus has become popular. The disk array apparatus connected to the host systems via the SAN is equipped with channel control units for receiving block access requests. Each channel control unit includes a plurality of Fibre Channel control processors for controlling the Fibre Channel interfaces used between the channel control unit and the host systems; and a plurality of channel processors for processing I/O requests from the host systems. As mentioned in Japanese Patent Laid-Open (Kokai) Publication No. 1997-160889, it is essential for a system equipped with a plurality of processors to control and equalize the loads on the respective processors to enhance the system processing efficiency.

SUMMARY OF THE INVENTION

However, in a conventional disk array apparatus, although there are plural channel processors provided in a channel control unit, an I/O request received via a port from a host system is processed by only one channel processor, therefore, resources of the rest of the channel processors are not utilized effectively. In order to achieve a speed-up of the Fibre Channel interface, reducing channel processor overhead is important and what is particularly ideal is efficient cache slot management including access to shared memory, and efficient processing to transfer data from the cache memory.

It is an object of the present invention to solve the above problem and reduce channel processor overhead.

In order to achieve the object the storage controller according to the present invention has: a plurality of channel processors for processing an I/O request from a host system; a cache memory for temporarily storing, in cache slots, data that is read and written by the channel processors in response to I/O requests from the host system; a local memory assigned to each of the channel processors for storing management information indicating whether or not data read and written by the relevant channel processor exists in the cache slot; and a buffer memory for storing data transmitted between the channel processors. When a first channel processor from among the channel processors receives an I/O request from the host system, it selects, based on the management information stored in the local memories of the respective channel processors, a second channel processor from among the channel processors, the second channel processor is to execute a part of processing to respond to the I/O request. The selected second channel processor checks whether there is a cache hit and if there is a cache hit, it transfers the data from the cache memory to the buffer memory. The first channel processor then processes the I/O request using the data transferred to the buffer memory. Because the second channel processor selected to execute a part of the processing to respond to the I/O request is selected based on the management information indicating whether or not the data read and written by the channel processors exists in the cache slots, the cache hit rate of the second channel processor can be enhanced. Accordingly, the channel processor overhead, which is caused by the cache slot management including access to the shared memory as well as the processing to transfer data from the cache memory, can be reduced.

The storage controller according to another aspect of the present invention has: a plurality of channel processors for processing an I/O request from a host system; a cache memory for temporarily storing, in cache slots, data that is read and written by the channel processors in response to I/O requests from the host system; and a buffer memory for storing data transmitted between the channel processors. When a first channel processor from among the channel processors receives the I/O request from the host system, it selects, based on the address of the data requested by the host system or the access pattern of the host system, a second channel processor from among the channel processors, which is to execute a part of processing to respond to the I/O request. The selected second channel processor checks whether there is a cache hit and if there is a cache hit, it transfers the data from the cache memory to the buffer memory. The first channel processor then processes the I/O request using the data transferred to the buffer memory. Because the second channel processor, that is to execute a part of the processing to respond to the I/O request, is selected, based on the address of data requested by the host system or the access pattern of the host system, the cache hit rate of the second channel processor can be enhanced. Accordingly, the overhead of the channel processors, which is caused by the cache slot management including access to the shared memory as well as the processing to transfer data from the cache memory, can be reduced.

According to the present invention, channel processor overhead can be reduced.

DETAILED DESCRIPTION OF THE INVENTION

An embodiment of the present invention is described below with reference to the attached drawings.

Figure 1:
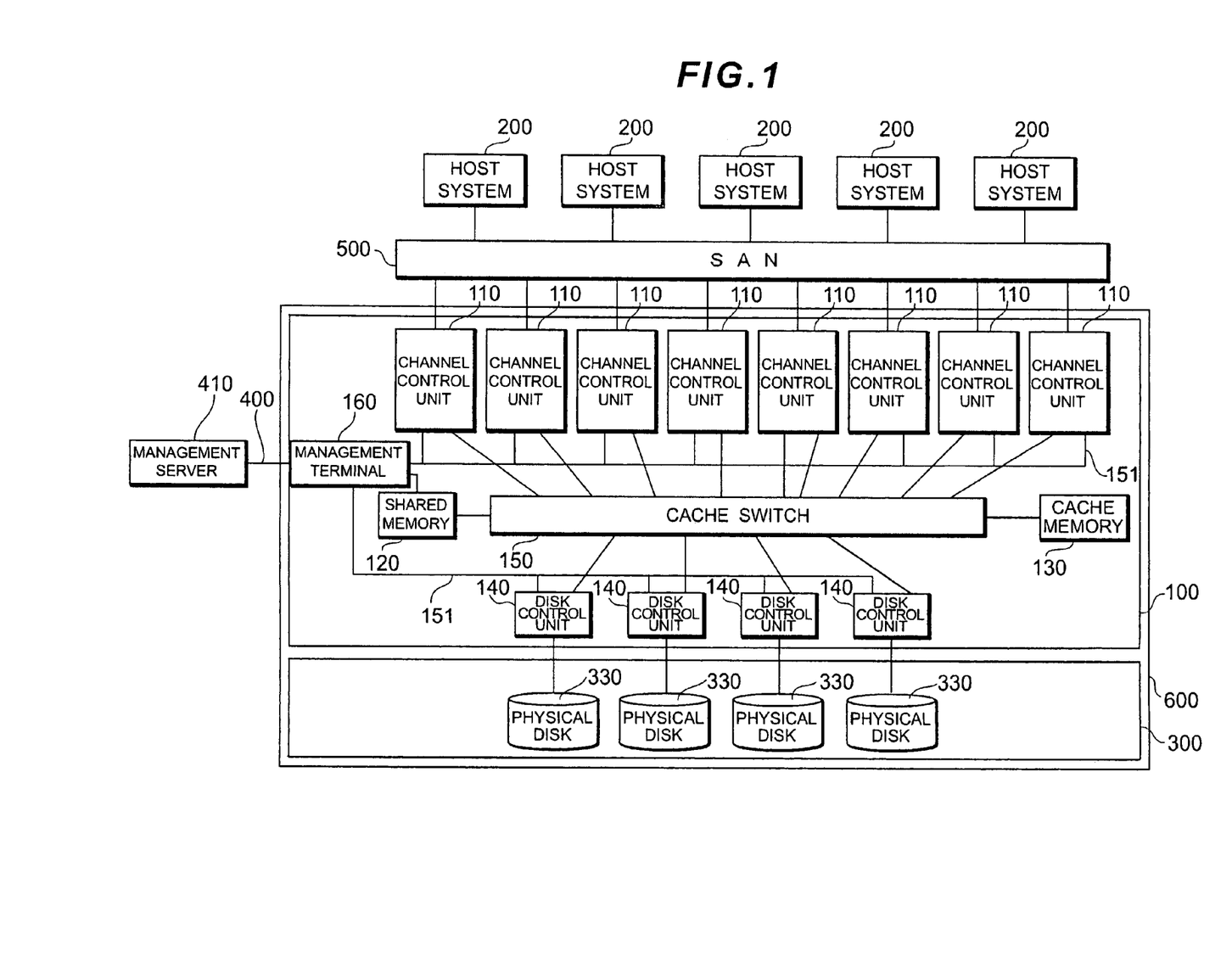
FIG. 1 shows the structure of a storage system according to an embodiment of the present invention.

FIG. 1 shows the hardware structure of a storage system 600 according to the present embodiment. The storage system 600 is mainly composed of a storage controller 100 and a storage apparatus 300. The storage controller 100 controls data input and output to and from the storage apparatus 300 according to, for example, commands from host systems 200. It also performs various processing, such as setting and changing of structural information for the storage system 600 according to, for example, commands from a management server 410.

Host systems 200 are front-end computers such as personal computers, work stations, or mainframe computers, and are used as automated teller machines in banks or flight seat reservation systems. The host systems 200 are connected to the storage controller 100 via a SAN 500 to enable communication therebetween. The SAN 500 is a network for transmitting data between the host systems 200 and the storage controller 100 in blocks, which are data management units in the storage resources provided by the storage apparatus 300. The communication protocol used between the host systems 200 and the storage controller 100 via the SAN 500 is, for example, Fibre Channel protocol.

Incidentally, the host systems 200 and the storage controller 100 are not necessarily connected via the SAN 500; they may also be connected via a Local Area Network (LAN), or they may be connected directly to each other without involving a network. If they are connected via a LAN, communications are made based on Transmission Control Protocol/Internet Protocol (TCP/IP). If they are connected directly to each other without involving a network, communication may be made based on communication protocols such as Fibre Connection (FICON; registered trademark), Enterprise System Connection (ESCON; registered trademark), Advanced Connection Architecture (ACONARC; registered trademark), and Fibre Connection Architecture (FIBARC; registered trademark).

The management server 410 is connected to a management terminal 160 via an external LAN 400. The external LAN 400 is configured with, for example, the Internet or a dedicated line. Communication between the management server 410 and the management terminal 160 via the external LAN 400 is made based on a communication protocol such as TCP/IP.

The storage apparatus 300 has a plurality of physical disk drives 330. The physical disk drives 330 are hard disk drives such as Advanced Technology Attachment (ATA) disk drives, Small Computer System Interface (SCSI) disk drives or Fibre Channel disk drives. By arranging plural disk drives in arrays, a Redundant Arrays of Inexpensive Disks (RAID) structure can be formed. The physical disk drives 330 provide physical storage areas, that is, physical volumes, for which logical devices can be set. The storage controller 100 and the storage apparatus 300 may be connected via a network or they may be connected directly to each other without involving a network. Alternatively, the storage controller 100 and the storage apparatus 300 may be integrated in one structure.

The storage controller 100 has channel control units 110, shared memory 120, cache memory 130, disk control units 140, a management terminal 160, and a cache switch 150.

The storage controller 100 communicates with the host systems 200 via the SAN 500 by means of the channel control units 110. Each channel control unit 110 has a communication interface for communication with the host systems 200 and has a function for transmitting data input/output commands between itself and the host systems 200. The channel control units 110 and the management terminal 160 are connected to each other via an internal LAN (shared bus) 151. Accordingly, the channel control units 110 can install, from the management terminal 160, micro programs to run therein.

The cache switch 150 connects the channel control units 110, shared memory 120, cache memory 130, disk control units 140, and the management terminal 160 to one another. Transmission of data and commands between them is conducted via the cache switch 150. The cache switch 150 is configured with, for example, a crossbar switch or the like.

The shared memory 120 and the cache memory 130 are memory apparatuses shared by the respective channel control units 110 and disk control units 140. The shared memory 120 is mainly used for storing resource configuration information and various commands. The cache memory 130 is mainly used for temporarily storing data read and written from and to the physical disks 330.

If a data input/output request a channel control unit 110 receives from a host system 200 is a write command, the channel control unit 110 writes the write command in the shared memory 120 and writes write data received from the host system 200 in the cache memory 130.

The disk control units 140 monitor the shared memory 120 at all times. When a disk control unit 140 detects that a write command has been written in the shared memory 120, it reads dirty data from the cache memory 130 and destages it in the physical disk drives 300.

Meanwhile, if a data input/output request a channel control unit 110 receives from a host system 200 is a read command, the channel control unit 110 checks whether read target data exists in the cache memory 130. If the read target data exists in the cache memory 130, the channel control unit 110 reads it and transmits it to the host system 200.

If the read target data does not exist in the cache memory 130, the channel control unit 110 writes a read command in the shared memory 120. The disk control units 140 monitor the shared memory 120 and when a disk control unit 140 detects that the read command has been written in the shared memory 120, it reads the read target data from the storage apparatus 300, writes it in the cache memory 130, and writes a report that effect in the shared memory. The relevant control unit 110 then detects that the read target data has been written in the cache memory 130, reads it from the cache memory 130 and transmits it to the host system 200.

As explained, the channel control units 110 and the disk control units 140 transmit data via the cache memory 130. The cache memory 130 temporarily stores, from among the data stored in the physical disk drives 330, data read and written by the channel control units 110 and the disk control units 140.

Incidentally, one or more virtual storage areas (hereinafter called the "cache slots") may be set in the cache memory 130. One cache slot is set for one logical volume. Specifically, a cache slot temporarily stores data written in or read from a corresponding logical volume.

The disk control units 140, being connected to the data-storing physical disk drives 330 to enable communication, control the storage apparatus 300. For example, they read and write data from and to the physical disk drives 330 according to data input/output requests received by the channel control units 110 from the host systems 200.

The disk control units 140 and the management terminal 160 are connected to each other via the internal LAN 151 to enable communication. Accordingly, the disk control units 140 can install, from the management terminal 160, micro programs to run therein.

The management terminal 160 is a computer controlling the storage system 600. By operating the management terminal 160, a system administrator can make settings for the configurations of the physical disk drives 330 and for paths between the host systems 200 and the channel control units 110, and install micro programs run in the channel control units 110 and the disk control units 140. Setting of the configurations of the physical disk drives 330 refers to increasing or decreasing the number of physical disk drives 330 as well as changing the RAID configuration (for example, from RAID 1 to RAID 5). With the management terminal 160, it is also possible to check the operational condition of the storage system 600, specify faulty sections, and install operating systems run in the channel control units 110. These various settings and controls can be performed via a user interface provided in the management terminal 160.

Figure 2:
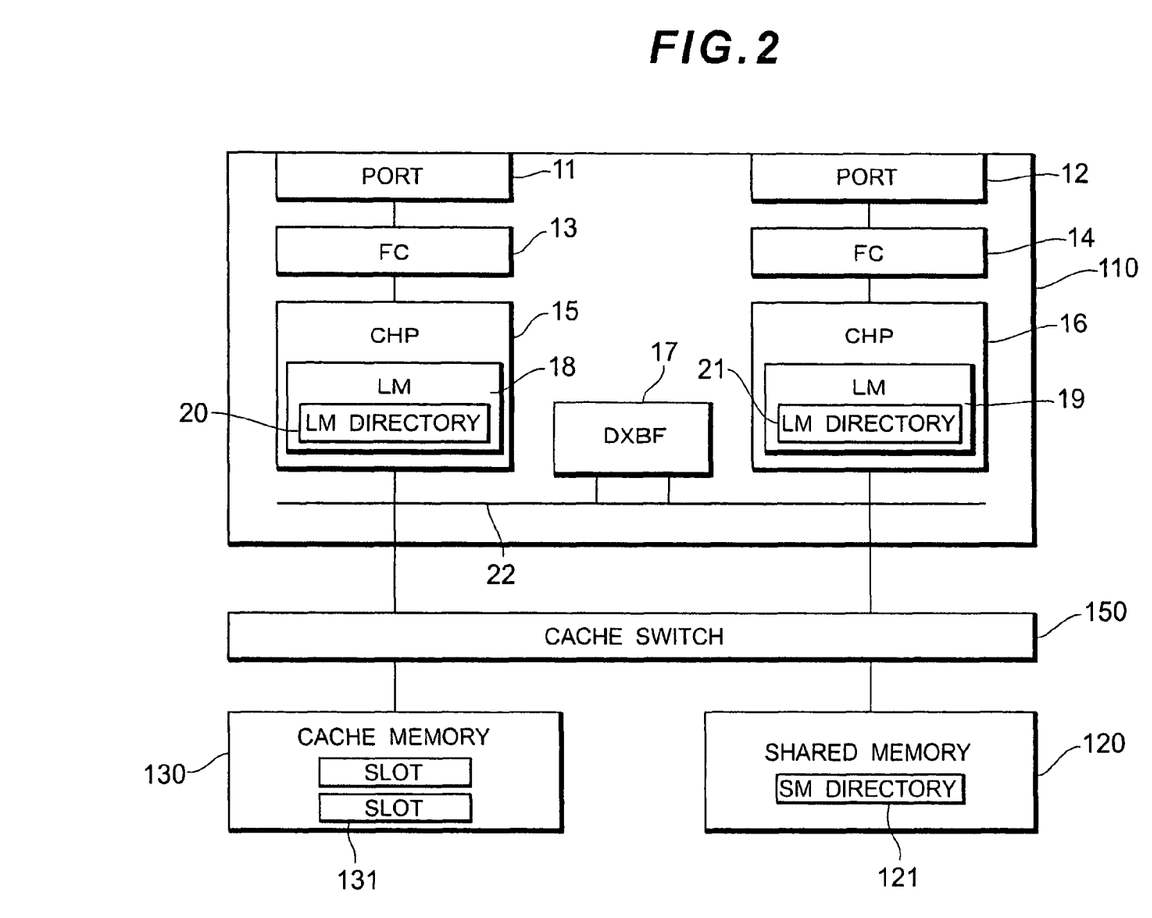
FIG. 2 shows the detailed structure of a channel control unit according to the present invention.

FIG. 2 shows the detailed structure of a channel control unit 110. A channel control unit 110 has a plurality of ports (11, 12), a plurality of Fibre Channel (FC) control processors (13, 14), a plurality of channel processors (CHP) (15, 16), a buffer memory (DXBF) 17 and a bus 22. The Fibre Channel control processors 13 and 14 control the Fibre Channel interface used between the host systems 200 and themselves. The channel processors 15 and 16 are dedicated processors for processing I/O requests from the host systems 200. The channel processor 15 has a local memory (LM) 18 for storing a local memory directory (LM directory) 20 or the like. The LM directory 20 is management information (cache management table) indicating whether data read and written by the channel processor 15 exists in the cache slots 131. A cache slot 131 is a data management unit in the cache memory 130 and has a per-track storable data size (256 KB). Likewise, the channel processor 16 has a local memory (LM) 19 for storing LM directory 21.

The buffer memory 17 is used for transmitting data between the channel processors 15 and 16. The bus 22 connects the Fibre Channel control processors 13 and 14, the channel processors 15 and 16, the buffer memory 17, and the cache switch 150 to one another. The channel processors 15 and 16 can communicate each other via the bus 22. The channel processor 15 can also refer to the LM directory 21 and write management information for the cache slots 131 in the LM directory 21 via the bus 22. Likewise, the channel processor 16 can refer to the LM directory 20 and write management information for the cache slots 131 in the LM directory 20 via the bus 22.

Incidentally, for ease of explanation, the case where the number of ports, Fibre Channel control processors and channel processors provided in the channel control unit 110 is two has been described; however, the present invention is not limited to that case. Accordingly, those elements can also number three or more.

The shared memory 120 stores a shared memory directory (SM directory) 121. The SM directory 121 is management information indicating whether data read and written by all the channel processors 15 and 16 in all the channel control units 110 exists in the cache slots 131. The aforementioned LM directories 20 and 21 are management information obtained by copying, from the management information of the SM directory, the management information indicating whether data read and written by the channel processor 15 exists in the cache slots 131, and the management information indicating whether data read and written by the channel processor 16 exists in the cache slots 131 respectively.

Figure 3:
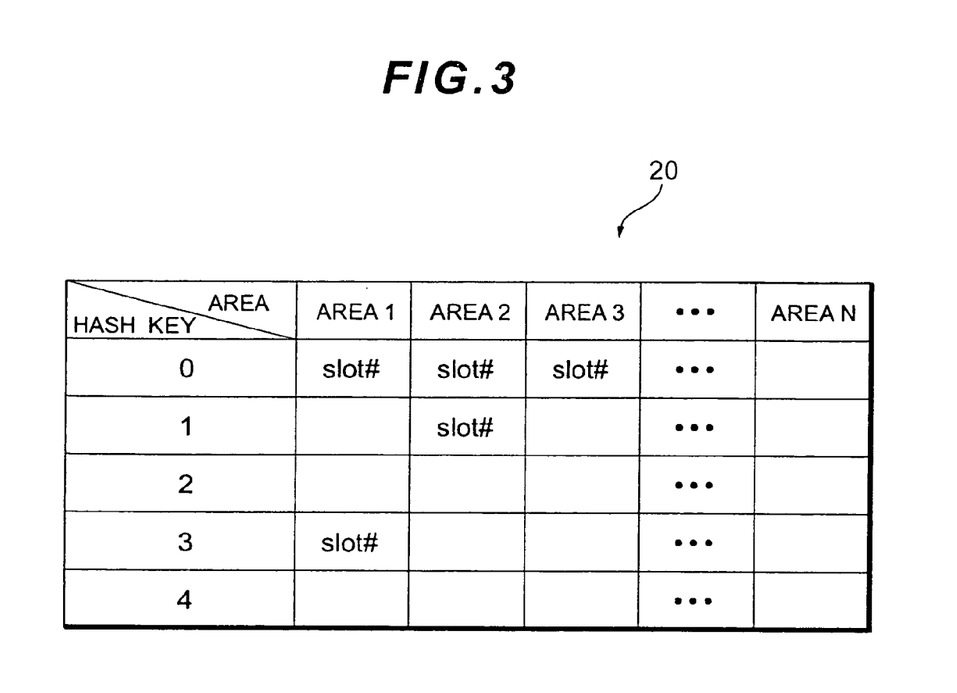
FIG. 3 illustrates a table structure for an LM directory according to the present invention.

FIG. 3 shows the table structure for the LM directory 20. The LM directory 20 is structured as a hash table. The channel processor 15 calculates a hash key based on the management information (slot numbers of the cache slots 131) copied from the SM directory 121 and registers the slot numbers in "vacant areas" among areas 1 to N that correspond to the hash key. A slot number (slot #) indicates an address of a virtual device (VDEV) and corresponds to an address of a cache slot.

A virtual device is structured by grouping four physical disks 330 in one group (3D+1P) or by grouping eight physical disks 330 in one group (7D+1P). In other words, one virtual device is formed by gathering storage areas respectively provided by plural physical disks 330. One virtual device can be divided into plural logical devices (LDEVs) and one logical device can be formed by gathering plural virtual devices. A logical device is mapped onto a logical unit (LU), which is a logical storage unit the host systems 200 recognize. For example, if the host systems 200 are UNIX (registered trademark) systems, a logical unit corresponds to a device file. If the host systems 200 are Windows (registered trademark) systems, a logical unit corresponds to a drive letter (drive name). A logical unit is assigned a unique logical unit number (LUN).

An address for a logical device is set by combining a LUN and a logical block address (LBA) (LUN+LBA). An address for a virtual device, on the other hand, is set by combining a VDED number and a slot number (VDEV number+slot number). The address for a logical device, the address for a virtual device, and the address for a cache slot 131 correspond one another and can be converted into one another. In this specification, an address where a VDEV number and a slot number are combined is called a "slot number" for the ease of explanation.

Now, the flow of processing performed when a channel processor 15 receives a read access from a host system 200 is explained below. The Fibre Channel control processor 13 analyzes the command received via the port 11 from the host system 200 and notifies the channel processor 15 of the receipt of the command. The channel processor 15 analyzes the command and calculates a slot number based on the address (LUN+LBA) of the read data. The channel processor 15 then checks whether the slot number corresponding to the read data address is registered in the LM directory 20. If the slot number is registered in the LM directory 20, the channel processor 15 obtains the data in the relevant cache slot 131 in the cache memory 130 and transfers it to the host system 200.

If the slot number is not registered in the LM directory 20, the channel processor 15 accesses the shared memory 120, refers to the SM directory 121, and checks whether the slot number is registered there. If the slot number is registered in the SM directory 121, the channel processor 15 obtains the data in the relevant cache slot 131 in the cache memory 130 and transfers it to the host system 200.

If the slot number is not registered in the SM directory 121, the channel processor 15 requests staging of the data to the cache memory 130 by the relevant disk control unit 140. When the staging of the data to the cache slot 131 in the cache memory 130 is complete, the channel processor 15 captures the data from the cache slot 131 in the cache memory 130 via the cache switch 150 and transfers it to the host system 200. It also registers the slot number corresponding to the cache slot 131, to which the staging was conducted, in the SM directory 121 and in the LM directory 20.

Incidentally, when the channel processor 15 does not need the cache slot 131 anymore, it releases it from management by the LM directory 21.

In the present embodiment, when a channel processor receives an I/O request from a host system 200, plural channel processors share the management of the relevant cache slots 131 involving access to the shared memory 120, and the processing such as data transfer from the cache memory 130 so that the overhead of the channel processors is reduced. Specifically, the overhead caused during cache access is reduced in such a manner that: an I/O request from a host system 200 is received by a first channel processor; a channel processor other than the first channel processor, that is, a second channel processor, transfers the relevant data from the cache memory 130 to the buffer memory 17; and the first channel processor transfers the data in the buffer 17 to the host system 200. In the selection of the second channel processor, it is preferable to select a channel processor that is most likely to have the cache slot of the host system 200-requested data registered therein. By transmitting a distribution processing request message from the first channel processor to the second channel processor while the second channel processor being most likely to have the cache slot registered in its LM directory), the overhead caused during cache access and reference to the SM directory can be reduced. Each method of distribution processing by the channel processors is explained below.

Distribution Processing Method 1

First, with reference to FIG. 2, I/O distribution processing method 1 performed between the channel processors 15 and 16 when the channel processor 15 receives a read access from a host system 200 is explained. The Fibre Channel control processor 13 analyzes the command received via the port 11 from the host system 200 and notifies the channel processor 15 of the receipt of the command. The channel processor 15 analyzes the command and calculates a slot number based on the address (LUN+LBA) of the read data address.

The channel processor 15 creates a distribution processing request message, which is a massage requesting distribution processing, and transmits it to the channel processor 16. The distribution processing request message includes transmitter identification information (for example, the identification number of the channel processor 15), a message ID for identifying the message, the address (LUN+LBA) of the read data, the data size of the read data, and the like.

When the channel processor 16 receives the distribution processing request message, it calculates a slot number based on the address (LUN+LBA) of the read data. The channel processor 16 then refers to the LM directory 21 and checks whether the slot number is registered in the LM directory 21. If it is registered in the LM directory 21, the channel processor 16 accesses the cache memory 130 via the cache switch 150 and transfers the data in the relevant cache slot 131 to the buffer memory 17. The buffer memory 17 has a plurality of storage areas, each being assigned to a channel processor to write data therein.

After the data transfer to the buffer memory 17 is completed, the channel processor 16 transmits a data transfer completion message to the channel processor 15. The data transfer completion message includes transmitter identification information (for example, the identification number of the channel processor 16), a message ID for identifying the message, the address of the buffer 17 in which the data has been written, a transmission result (success or failure) and the like.

When the channel processor 15 receives the data transfer completion message from the channel processor 16, it transmits a command to read the data from the buffer memory 17 to the Fibre Channel control processor 13. The Fibre Channel control processor 13 then reads the data from the buffer memory 17 and transfers it to the host system 200.

If the slot number is not registered in the LM directory 21, the channel processor 16 accesses the shared memory 120, refers to the SM directory 121, and checks whether the slot number is registered in the SM directory 121. If it is registered in the SM directory 121, the channel processor 16 obtains the data in the relevant cache slot 131 in the cache memory 130 and transfers it to the buffer memory 17.

If the slot number is not registered in the SM directory 121, the channel processor 16 requests staging of the data to the cache memory 130 by the relevant disk control unit 140. When the staging of the data to the relevant cache slot 131 in the cache memory 130 is completed, the channel processor 16 captures the data from the relevant cache slot 131 in the cache memory 130 via the cache switch 150 and transfers it to the buffer memory 17. It also registers the slot number corresponding to the cache slot 131, to which the staging was conducted, in the SM directory 121 and in the LM directory 21.

Incidentally, after the channel processor 15 transmits the distribution processing request message to the channel processor 16, it may perform other processing (such as processing to respond to I/O requests transmitted from the host systems 200 in order). Although the above description is about the processing performed when the channel processor 15 receives a read access from a host system 200, when the channel processor 15 receives a write access from a host system 200, the processing to write data in the cache memory 130 can also be distributed between the channel processors 15 and 16.

As explained, with the distribution processing method 1, because the channel processor 16, which is not the channel processor 15 that received the I/O request from a host system 200, is in charge of managing the cache slots 131, the management involving access to the shared memory 120 and performing processing such as data transfer from the cache memory 130, the processing of the I/O request from the host system 200 can be distributed among the channel processors, thereby reducing the overhead on the channel processors.

Distribution Processing Method 2

Figure 4:
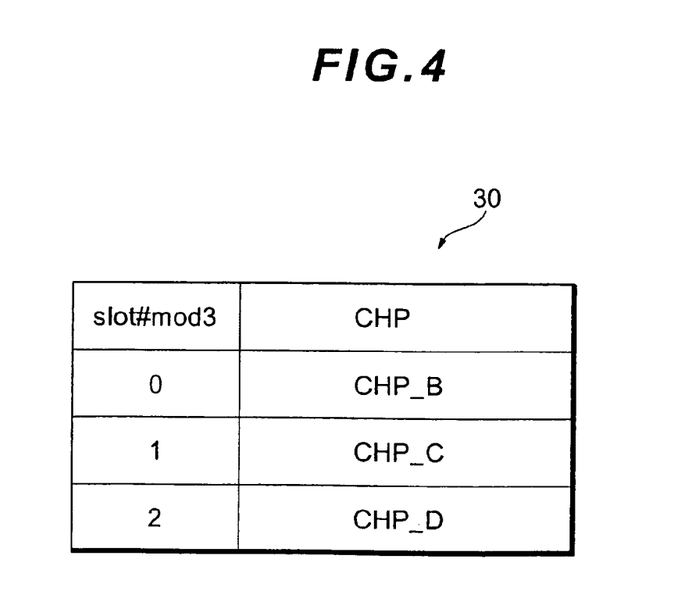
FIG. 4 illustrates a table for selecting a channel processor as a target for distribution processing according to the present invention.
Figure 5:
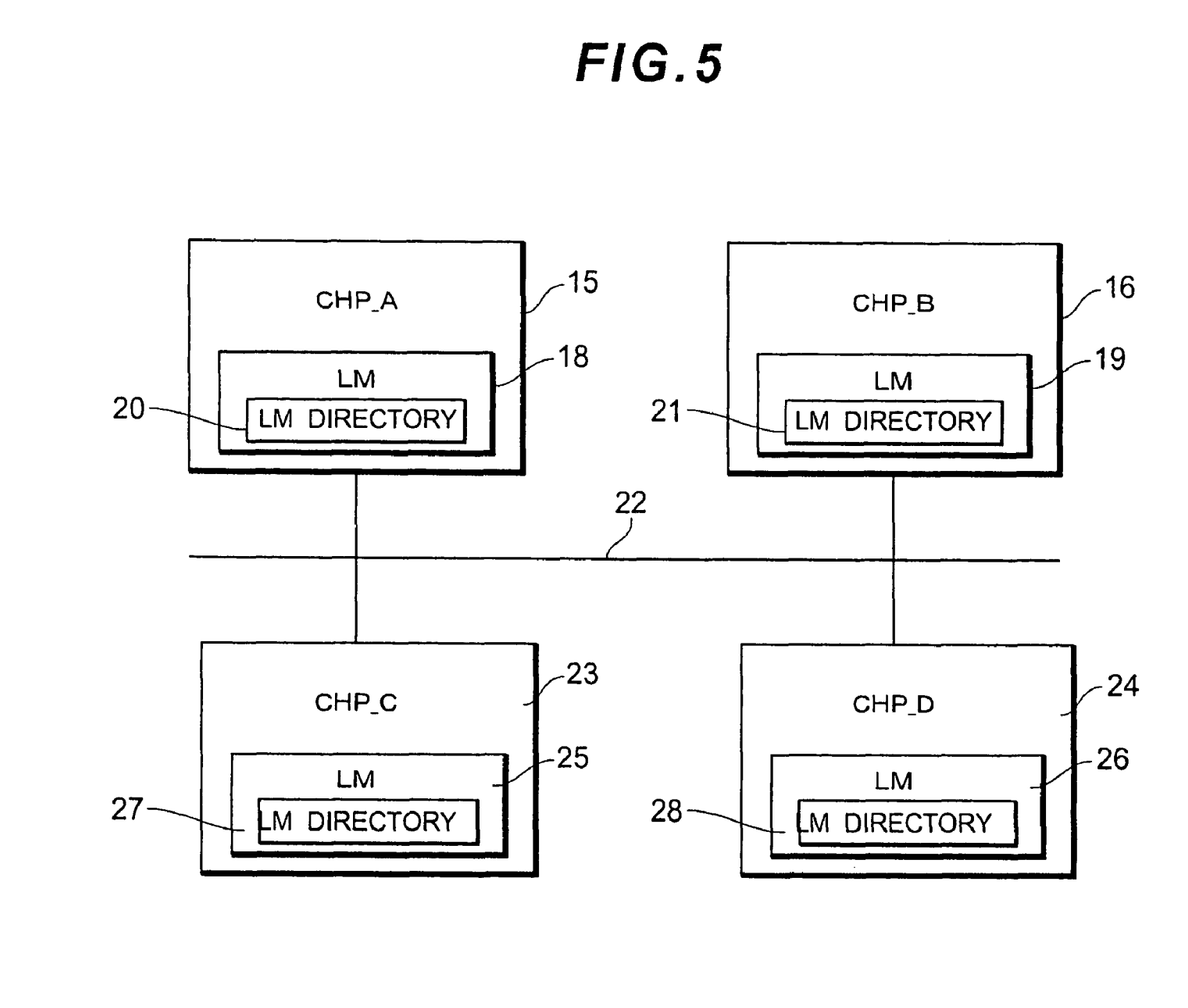
FIG. 5 illustrates channel processor distribution processing performed between the channel processors according to the present invention.

Now, with reference to FIGS. 4 and 5, I/O distribution processing method 2 performed between the channel processors 15, 16, 23, and 24 when the channel processor 15 receives a read access from a host system 200 is explained. FIG. 5 shows an example where four channel processors 15, 16, 23, and 24 are connected to each other via the bus 22 in one channel control unit 110. For ease of explanation, the Fibre channel control processors and the buffer memory are omitted. Incidentally, the channel processors 15, 16, 23, and 24 may sometimes be called CHP_A, CHP_B, CHP_C, and CHP_D respectively.

First, the channel processor 15 checks its own processor usage rate (rate of time spent on I/O processing within a fixed time period) periodically and if the processor usage rate exceeds a predetermined threshold value, it judges that the channel processor 15 itself is a bottleneck for I/O processing, and executes the I/O distribution processing.

The channel processor 15 then checks the processor usage rates of the channel processors 16, 23 and 24. If their processor usage rates are below the predetermined threshold value, the processors are judged as candidate targets for distribution processing. In the selection of processors to be candidate targets for distribution processing, it is possible to select them based on the presence or absence of I/O to their channel processors instead of based on their processor usage rates. Ideally, the channel processors 15, 16, 23 and 24 write, in their local memory 18, 19, 25 and 26, information such as their own processor usage rates or the presence or absence of I/O so that they can refer to each other's information. The example explained now assumes that only the channel processor 15 receives a read access from a host system 200, so the rest of the channel processors 16, 23 and 24 are candidate targets for distribution processing.

The channel processor 15 then calculates a slot number based on the address (LUN+LBA) of the read data, and selects a channel processor as a target for the distribution processing according to the value calculated by a predetermined calculation method based on the slot number. There may be various possible calculation methods. For example, as shown in the table 30 in FIG. 4, the target may be selected by establishing correspondence relationships between the CHP_B, CHP_C and CHP_D and the remainder of the read data's slot number divided by 3. For example, if the remainder of the slot number of the read data divided by 3 is 0, a distribution processing request message is transmitted to the CHP_B so that the CHP_B takes charge of managing the cache slots 131, the management involving access to the shared memory 120, and performing processing such as data transfer from the cache memory 130. If the remainder of the slot number divided by 3 is 1, the message is transmitted to the CHP_C, while if the remainder is 2, the message is transmitted to CHP_D. The channel processor that receives the distribution request message performs the same processing as in the distribution processing method 1. The table 30 is stored in the local memory 18 of the channel processor 15.

Because a channel processor that becomes the target for the distribution processing is selected as above, the same channel processor always processes access to the same data; therefore, the relevant cache slot 131 is more likely to be registered in the LM directory of the channel processor, thereby enhancing the processing speed-ups.

Incidentally, if the number of candidate target channel processors for the distribution processing is N, a target channel processor may be selected by establishing correspondence relationships in advance between the channel processors and the remainders of each read data's slot number divided by N.

Data processing using the distribution processing method 2 includes: a step where a first channel processor among plural channel processors receives an I/O request from a host system; a step where a second channel processor is selected from the channel processors according to the value obtained by a predetermined calculation based on the address of data requested by the host system, the second channel processor executing a part of the processing to respond to the I/O request; a step where the second channel processor checks whether there is a cache hit and if there is a cache hit, it transfers the data from the cache memory to the buffer memory; and a step where the first channel processor processes the I/O request using the data transferred to the buffer memory.

Distribution Processing Method 3

Now, with reference to FIG. 5, I/O distribution processing method 3 performed between the channel processors 15, 16, 23 and 24 when the channel processor 15 receives a read access from a host system 200 is explained.

Just as in the distribution processing method 2, the channel processor 15 checks its own processor usage rate and decides whether or not to perform the distribution processing. If the processor usage rate exceeds a predetermined threshold value, the channel processor 15 checks the processor usage rates or the presence/absence of I/O in the channel processors 16, 23 and 24 and selects channel processors to become candidate targets for distribution processing. The example explained now assumes that only the channel processor 15 receives a read access from a host system 200, therefore the rest of the channel processors 16, 23 and 24 are candidate targets for distribution processing.

The channel processor 15 then refers to the LM directories 21, 27 and 28 of the channel processors 16, 23 and 24 via the bus 22 and searches for a channel processor having the cache slot 131 of the read data registered therein. If there is a channel processor having the cache slot of the read data registered, a distribution processing request message is transmitted to that channel processor. The channel processor that receives the message performs the same processing as in the distribution processing method 1. If there is no channel processor having the cache slot 131 of the read data registered, the channel processor 15 selects a channel processor with a light I/O load and transmits the message to that channel processor.

With this method, enhancement of the I/O processing performance can be expected when a desired cache slot 131 is registered in the LM directory of a channel processor with a light I/O load.

Incidentally, application of the distribution processing method 3 is premised on the table structures of the LM directories 21, 27, and 28 of the channel processors 16, 23 and 24 being the same as that of the LM directory 20 of the channel processor 15.

Data processing using the distribution processing method 3 includes: a step where a first channel processor among plural channel processors receives an I/O request from a host system; a step where a second channel processor is selected from the channel processors based on management information indicating whether data read and written by the channel processors exists in the cache slots, the second channel processor executing a part of the processing to respond to the I/O request; a step where the second channel processor checks whether there is a cache hit and if there is a cache hit, it transfers the data from the cache memory to the buffer memory; and a step where the first channel processor processes the I/O request using the data transferred to the buffer memory.

Distribution Processing Method 4

Figure 6:
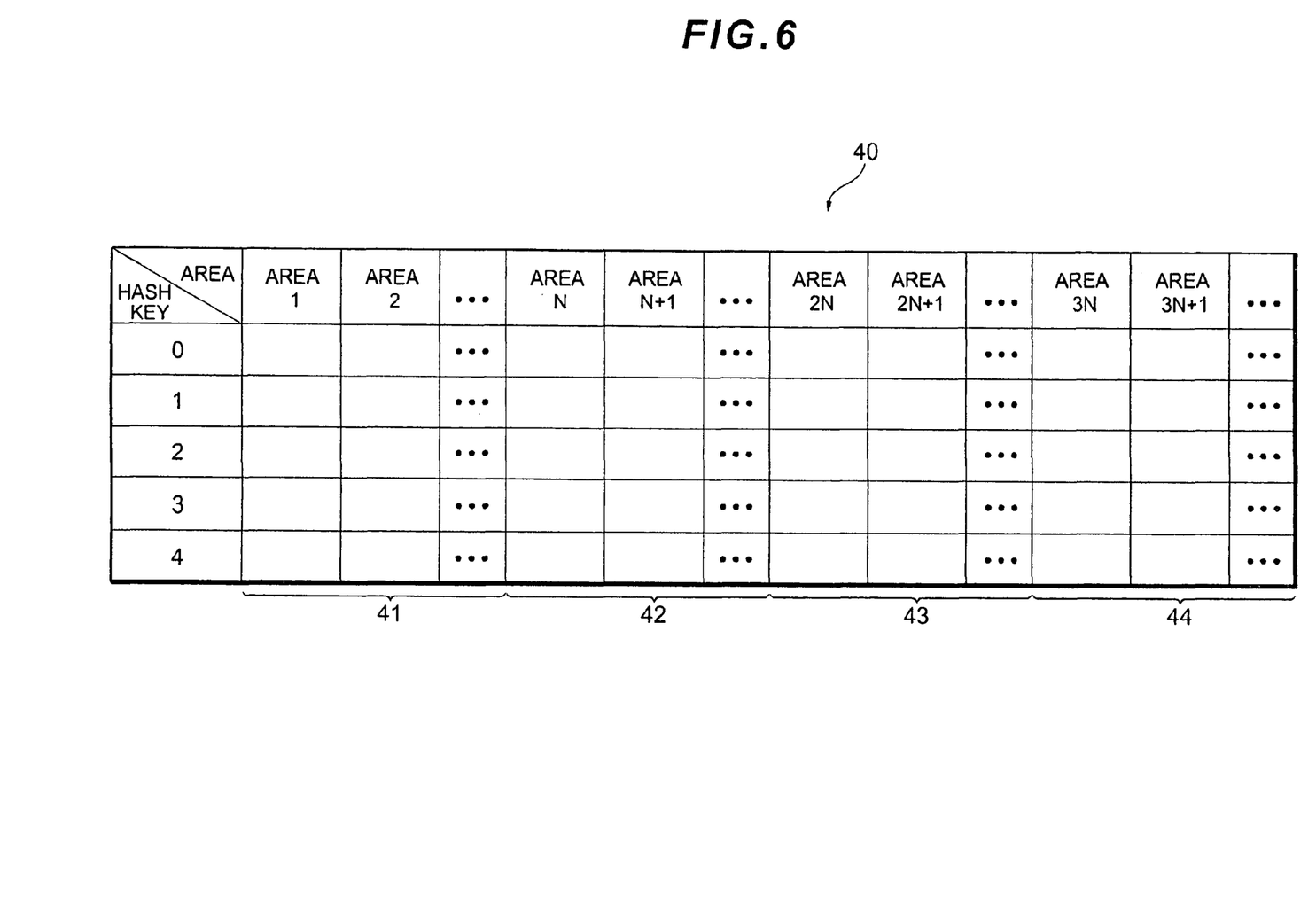
FIG. 6 illustrates another table structure for the LM directory according to the present invention

Now, with reference to FIGS. 5 and 6, I/O distribution processing method 4 performed between the channel processors 15, 16, 23 and 24 when the channel processor 15 receives a read access from a host system 200 is explained. It is the same as in the distribution processing method 2 in that the processor usage rates of the channel processors 16, 23 and 24 are checked in order to select, in advance, channel processors to become candidate targets for the distribution processing.

In the distribution processing method 4, each of the LM directories 20, 21, 27 and 28 of the channel processors 15, 16, 23 and 24 has the same table structure as the LM directory 40 shown in FIG. 6. In FIG. 6, reference number 41 indicates an LM directory that manages the management information for the cache slots 131 of the channel processor 15. Reference number 42 indicates an LM directory that manages the management information for the cache slots 131 of the channel processor 16. Reference number 43 indicates an LM directory that manages the management information for the cache slots 131 of the channel processor 23. Reference number 44 indicates an LM directory that manages the management information for the cache slots 131 of the channel processor 24. When the channel processor 15 updates the LM directory 41 stored in its local memory 18, it updates the LM directories stored in the local memory 19, 25 and 26 of the other channel processors 16, 23 and 24. Likewise, when the channel processor 16, 23 or 24 updates the LM directory stored in its local memory, it updates the LM directories of the other channel processors. In this method, the channel processors 15, 16, 23 and 24 refer to their own local memory 18, 19, 25 and 26, to find which channel processor has the relevant cache slot registered therein. The channel processor 15 then transmits a distribution processing request message to the channel processor having the relevant cache slot registered in its LM directory. After receiving the distribution processing request message, the channel processor executes the same processing as in the distribution processing method 1.

With the distribution processing method 4, searching for a channel processor having the relevant cache slot registered in its LM directory can be performed more speedily.

Distribution Processing Method 5

Now, with reference to FIG. 5, I/O distribution processing method 5 performed between the channel processors 15, 16, 23 and 24 when the channel processor 15 receives a read access from a host system 200 is explained. Just as in the distribution processing method 2, the processor usage rates of the channel processors 16, 23 and 24 are checked to select channel processors to become candidate targets for the distribution processing.

With the distribution processing method 5, the channel processor 15, which has received the I/O request from the host system 200, can know the access pattern of the host system 200. For example, if the access pattern is sequential access, the channel processor 15 selects a fixed channel processor (for example, the channel processor 16) and if the access pattern is random access, it selects a channel processor by an appropriate method (for example, any of the aforementioned distribution processing methods). The channel processor 15 then transmits a distribution processing request message to the selected channel processor.

In the case of sequential access, a channel processor can perform prefetch processing to prefetch data from the physical disks 330; accordingly, it is preferable to determine a fixed channel processor to become a distribution target in advance. Prefetched data is accumulated in the buffer memory 17 in order. Whether the access pattern is sequential access or not is determined by whether the number of successive accesses is more than a predetermined number.

With the distribution processing method 5, the data prefetch processing can be performed efficiently by knowing the access pattern of the host system 200, thereby enhancing the I/O processing performance.

Data processing using the distribution processing method 5 includes: a step where a first channel processor among plural channel processors receives an I/O request from a host system; a step where a second channel processor is selected from the channel processors based on the access pattern of the host system, the second channel processor executing a part of the processing to respond to the I/O request; a step where the second channel processor checks whether there is a cache hit, and if there is a cache hit, it transfers the data from the cache memory to the buffer memory; and a step where the first channel processor processes the I/O request using the data transferred to the buffer memory.

Distribution Processing Method 6

Now, with reference to FIG. 5, I/O distribution processing method 6 performed between the channel processors 15, 16, 23 and 24 when the channel processor 15 receives a read access from a host system 200 is explained.

The channel processor 15 refers to load information written in the local memories 19, 25 and 26 of the channel processors 16, 23 and 24 and selects a channel processor to become a target for the distribution processing. Examples of the load information are as follows.

(1) IOPS: the number of executions of I/O processing per unit of time (2) Transfer rate: data transfer amount per unit of time (3) Response time: the time between a channel processor's receipt of an I/O request from a host system and it's response (4) IO processing time: the time required for the channel processor to perform the I/O processing (5) Distribution IO processing time: the time between a first channel processor's transmission of a distribution processing request message to a second channel processor and the second channel processor's completion of the processing (6) Distribution IO processing response time: the time between a channel processor's receipt of an I/O request and it's response (7) LM directory hit rate: probability of cache slot registration in an LM directory With the distribution processing method 6, it is possible not only to select the channel processor most appropriate as a distribution target based on the load information for the respective channel processors, but also to adjust the frequency of the distribution processing so that the processing performance of the entire channel control unit can be optimized.

Data processing using the distribution processing method 6 includes: a step where a first channel processor among plural channel processors receives an I/O request from a host system; a step where a second channel processor is selected from the channel processors based on the load information of the respective channel processors, the second channel processor executing a part of the processing to respond to the I/O request; a step where the second channel processor checks whether there is a cache hit, and if there is a cache hit, it transfers the data from the cache memory to the buffer memory; and a step where the first channel processor processes the I/O request using the data transferred to the buffer memory.

Each of the distribution processing methods explained above is executed by a computer program loaded in channel processors in channel control units. The computer program may also be stored on media instead of being provided in the channel processors as above. Preferable examples of the media include: optical media (media that can optically read data, such as CD-RAMs, CD-ROMs, DVD-RWs, DVD-ROMs, DVD-Rs, PD disks, MD disks, and MO disks); magnetic media (media that can magnetically read data, such as flexible disks, magnetic cards and magnetic tapes); and memory elements (such as semiconductor memory elements such as DRAM and ferroelectric memory elements such as FRAM).

What is claimed is:

1. A storage controller connected to a plurality of disk drives comprising:

a shared memory;

at least one channel control unit;

a cache memory connected to the at least one channel control unit via a cache switch and having cache slots and temporarily storing data stored in said plurality of disk drives;

at least one disk control unit connected to the cache memory via the cache switch and configured to control data transfer between the at least one channel control unit and the plurality of disk drives, wherein the at least one channel control unit includes:

a plurality of channel processors each configured to process a read/write request from a host system, a plurality of local memories, each of which corresponds to one of the plurality of channel processors and stores a first management information and a group information, the first management information indicates whether data read and written by a corresponding channel processor exists in one of the cache slots of the cache memory, the group information indicates a relationship between each of a plurality of logical addresses provided to the host system and one of the plurality of channel processors; and a buffer memory, connected to the plurality of channel processors, for storing data transmitted between the plurality of channel processors, wherein the shared memory stores second management information indicating whether data read and written by the plurality of channel processor exists in one of the cache slots of the cache memory, wherein, when a first channel processor from among the plurality of channel processors receives a read request from the host system, the first channel processor selects a second channel processor from among the other channel processors based on the group information, and the first channel processor transmits a distribution processing request to the second channel processor, wherein upon receipt of the distribution processing request, the second channel processor checks whether a cache hit occurs based on the first management information corresponding to the second channel processor in one of the plurality of local memories corresponding to the second channel processor, wherein if the cache hit occurs with the first management information, then the second channel processor fetches the data from one of the cache slots of the cache memory and writes the fetched data in the buffer memory and the first channel processor controls transfer of data written in the buffer memory to the host system; and wherein if the cache hit does not occur with the first management information, then the second channel processor checks whether a cache hit occurs based on the second management in the shared memory.

2. The storage controller according to claim 1, wherein the first channel processor selects the second channel processor based on a usage rate of each of the plurality of the channel processors.

3. The storage controller according to claim 1, wherein the management information stored in each of the local memories includes director information managed by the plurality of channel processors.

4. The storage controller according to claim 1, wherein the first channel processor selects the second channel processor based on an access pattern of the host system.

5. The storage controller according to claim 1, wherein each of the plurality of channel processor writes load information in the corresponding local memory in accordance with a read/write request, and wherein the first channel processor looks up the local memories corresponding to the other channel processors, and the first channel processor selects the second channel processor from among the other channel processor based on the load information stored in the local memories.

6. The storage controller according to claim 1, wherein if the cache hit does not occur with both the first management information and the second management information, the second channel processor, the second channel processor fetches the data from the plurality of disk drives and writes the fetched data in the buffer memory, and the first channel processor controls transfer of data written in the buffer memory to the host system.

7. The storage controller according to claim 1, wherein if the cache hit occurs with the first management information the second channel processor fetches the data from one of the cache slots of the cache memory and writes the fetched data in the buffer memory, and the first channel processor controls transfer of data written in the buffer memory to the host system.

* * * * *